US008639766B2

(12) United States Patent
Bouazizi

(10) Patent No.: US 8,639,766 B2
(45) Date of Patent: Jan. 28, 2014

(54) SYSTEM AND METHOD FOR MULTIPLE-LEVEL MESSAGE FILTERING

(75) Inventor: Imed Bouazizi, Tampere (FI)

(73) Assignee: Nokia Corporation (FI)

( * ) Notice: Subject to any disclaimer, the term of this patent is extended or adjusted under 35 U.S.C. 154(b) by 54 days.

(21) Appl. No.: 12/388,111

(22) Filed: Feb. 18, 2009

(65) Prior Publication Data
US 2009/0210510 A1 Aug. 20, 2009

Related U.S. Application Data

(60) Provisional application No. 61/029,846, filed on Feb. 19, 2008.

(51) Int. Cl.
G06F 15/16 (2006.01)
(52) U.S. Cl.
USPC .......................... 709/207; 709/205; 709/206
(58) Field of Classification Search
USPC .................................................. 709/205–207
See application file for complete search history.

(56) References Cited

U.S. PATENT DOCUMENTS

| 2006/0159096 | A1 | 7/2006 | Gershinsky et al. | |
| 2006/0200526 | A1 | 9/2006 | Cina | |
| 2007/0086465 | A1* | 4/2007 | Paila et al. | 370/394 |
| 2007/0101352 | A1* | 5/2007 | Rabina et al. | 725/1 |
| 2007/0124359 | A1* | 5/2007 | Hwang et al. | 709/200 |
| 2007/0207727 | A1* | 9/2007 | Song et al. | 455/3.06 |
| 2007/0208853 | A1 | 9/2007 | Yang | |
| 2007/0282953 | A1 | 12/2007 | Jain et al. | |
| 2008/0045251 | A1* | 2/2008 | Jeon et al. | 455/466 |
| 2008/0090513 | A1* | 4/2008 | Collins et al. | 455/3.01 |
| 2008/0189540 | A1* | 8/2008 | Jansky | 713/2 |
| 2010/0106796 | A1* | 4/2010 | Van Gassel et al. | 709/207 |

FOREIGN PATENT DOCUMENTS

| EP | 1816766 A2 | 8/2007 |
| WO | 03/052650 A2 | 6/2003 |
| WO | 2007/082190 A2 | 7/2007 |

OTHER PUBLICATIONS

International Search Report and Written Opinion received for corresponding Patent Cooperation Treaty Application No. PCT/IB2009/000294, mailed on Jun. 8, 2009, 13 pages.
"New mobile services at big events using DVB-broadcast and wireless network", FP6-2005-IST-61-045410, WP4 D4.3, version 1.0, retrieved from the Internet: http://www.hitech-projects.com/euprojects/mobiserve/deliverables/Mobiserve%20D4.3_Mobiserve%20application%20for%20open%20API.pdf, Feb. 2007.
Office Action for Russian Patent Application No. 2010138321/807(054742), dated Sep. 15, 2011.

(Continued)

Primary Examiner — Chau Le
(74) Attorney, Agent, or Firm — Banner & Witcoff, Ltd.

(57) ABSTRACT

Systems and methods for constructing multiple-level filtering information that is applicable for an aggregate of multiple messages. According to various embodiments, a set of filtering values is constructed for a first level as a union of all filter values of the filtering criteria that belong to the intersection set of filter criteria. At the receiver side, the aggregate transport object is filtered based on the first-level filtering information as a first process. The first-level filtering information may be separate of the transport object. If the transport object is not discarded after first-level filtering, then the second-level filtering information, which requires the processing of the transport object, is used to fetch the messages in the bundle.

20 Claims, 15 Drawing Sheets

(56) References Cited

OTHER PUBLICATIONS

English translation of Office Action for Russian Patent Application No. 2010138321/807(054742), dated Sep. 15, 2011.

Non-Final Rejection dated Apr. 9, 2012 in Korean Application No. 10-2010-7019948 and English translation thereof.

China Patent Application No. 200980110975.7, Office Action dated Mar. 28, 2012, with translation.

Canadian Patent Application No. 2,716,011—Office Action dated Nov. 27, 2012.

\* cited by examiner

US 8,639,766 B2

SYSTEM AND METHOD FOR MULTIPLE-LEVEL MESSAGE FILTERING

FIELD OF THE INVENTION

The present invention relates generally to the use of notification applications within the context of notification frameworks. More particularly, the present invention relates to the providing of filtering information in a notification framework.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Digital Video Broadcasting Convergence of Broadcast and Mobile Services (DVB-CBMS) Group is preparing a notification framework for enabling the delivery of different types of notification messages to a significant population of receivers. Such notification messages can provide information about, for example, forthcoming and unscheduled events. Different types of notification events may be delivered over the notification framework.

Notification messages may either be synchronized to audio/visual (A/V) content or they may comprise a standalone service. Synchronized notification messages describe events that are related to some A/V service, e.g. requests for voting or contextual advertisements. Standalone notification services carry notification messages that are grouped by certain criteria but are not related to an A/V service. An example of a standalone notification service is a stock market ticker that delivers share prices.

Notification services may be default or user-selected services. Default notification messages are of interest to all receivers and are therefore expected by receivers to be automatically received. An example of such a default notification service is an emergency notification service. User-selected notification messages are only received in response to a user selection or request to receive such message. Depending on the type of the notification service, the delivery of the notification messages may differ.

SUMMARY OF THE INVENTION

Various embodiments provide a method, computer program product and apparatus for implementing first-level filtering at a sending device. According to these embodiments, filtering criteria that are common to all messages of an aggregate is collected into first-level filtering information. For each filtering criterion in the first-level filtering information, filter values associated with at least one of the messages of the aggregate are also collected into the first-level filtering information. The first-level filtering information is then transmitted to a remote device. The first-level filtering information may be transmitted separate from an associated transport object.

Various embodiments also provide a method, computer program product and apparatus for filtering aggregate messages at a receiving device. According to these embodiments, at least one filtering criterion and at least one associated filter value is extracted from first-level filtering information associated with a transport object. At least one user preference is compared with the first-level filtering information, the at least one user preference being expressed in terms of at least one logical operator. It is then decided, based upon the comparing of the at least one user preference with the first-level filtering information, whether to discard the transport object. If the transport object is not discarded, the transport object undergoes a filtering procedure.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
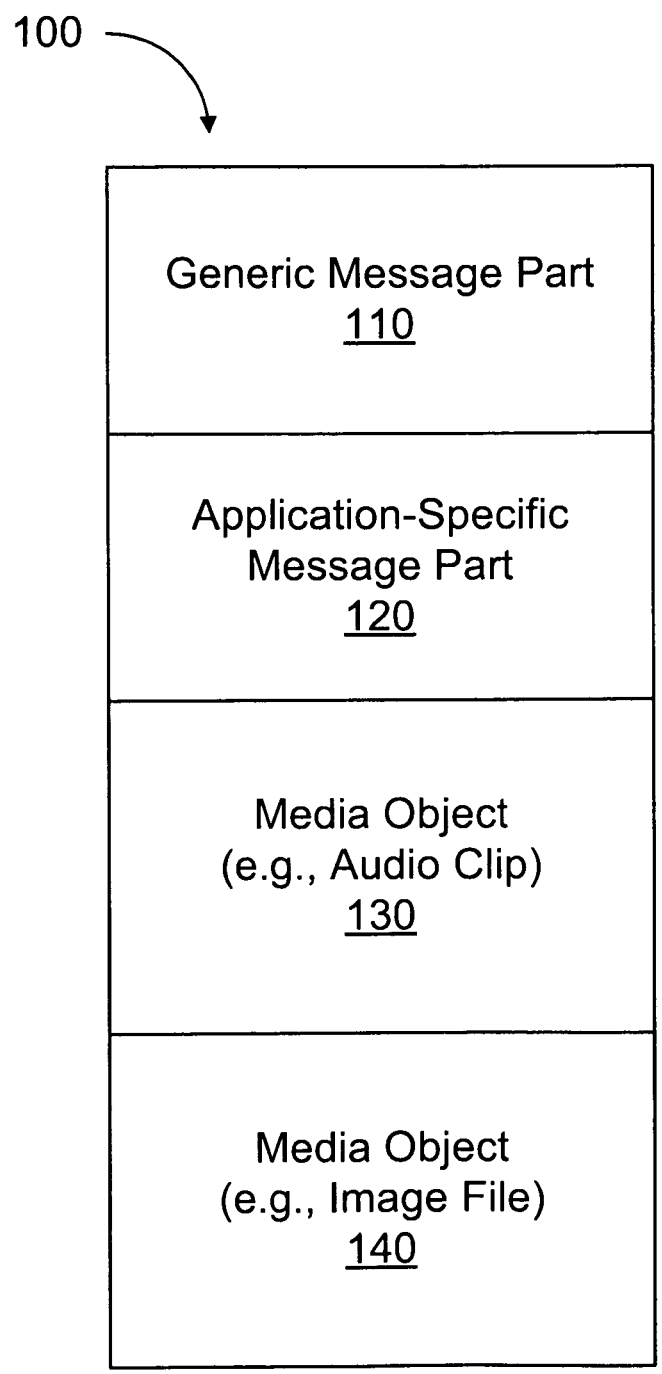
FIG. 1 is an exemplary representation of the structure of a notification structure.

FIG. 1 is an exemplary representation of the structure of a notification message structure. Notification messages comprise three parts. First, a generic message part 110, e.g., an XML fragment, contains generic information about a notification message 100 and is consumed by the notification framework. Second, an application-specific message part 120 is a fragment, e.g., in an XML format, that contains the information used to describe the content of the notification message 100. The application-specific message part 120 is consumed by an application capable of processing the application-specific part 120 of the notification message 100. Finally, the third part of the notification message 100 comprises various media objects, such as audio clips 130 and image files 140. During the lifetime of an individual event, a corresponding notification message may be updated with different action commands to be performed by a receiver.

Two different transport protocols may be used for the delivery of notification messages over the (DVB-H) broadcast channel. File Delivery Over Unidirectional Transport (FLUTE) and Real-Time Transport Protocol (RTP). FLUTE is to be used for the delivery of unsynchronized and default notification messages. On the other hand, RTP is to be used primarily for the delivery of synchronized, service-related notification messages. Alternatively, a combination of RTP and FLUTE can be used, where the larger payload of a notification message, e.g., application-specific message part and media objects if any, can be transported using FLUTE, while, e.g. only the generic message part of the notification message is delivered using RTP.

For RTP delivery, an RTP payload format header usually indicates the information that enables the correct processing and extraction of the notification message. The RTP payload format header may also allow the filtering of notification messages based on, e.g., their notification type. Additionally, the header usually provides the functionality for fragmentation and reassembly of notification messages that exceed the maximum transmission unit (MTU) size.

A similar extension to the file delivery table (FDT) of FLUTE also provides identification and fast access to information fields that are necessary for the selection of notification messages. The notification message parts may then be encapsulated and carried as a single transport object or as separate transport objects. The generic message part usually provides a list of the message parts that constitute the corresponding notification message. This enables the notification framework to retrieve all parts of a notification message and make them available to the consuming notification application. The references to the media objects and the description of the way to use them are usually provided by the application-specific message part. However, as the application-specific message part is not read by the notification framework, significant delays for reconstructing the notification message may occur if the notification framework is not aware of all the message parts to be retrieved.

In order to enable accelerated selection and filtering of notification messages of interest to the user/terminal, a filtering mechanism is defined in the notification framework. Filtering criteria may be defined and delivered in advance to the notification framework. Each notification message may indicate the filtering values that apply to the notification message at issue. The notification framework is aware of the user/terminal preferences, which are expressed in terms of filtering values for a set of filtering criteria. Upon receiving a notification message, the filtering values are checked against the preferences of the user/terminal, and messages that are not of interest to the user/terminal are discarded.

Various embodiments provide systems and methods for constructing multiple-level filtering information that is applicable for an aggregate of multiple messages. According to various embodiments, a set of filtering values is built for the first level as the union of all filter values associated with filtering criteria that are common to all messages of the same aggregate. The first-level filtering information may be sent separate from the underlying transport object. At the receiver side, the aggregate transport object is filtered using the first-level filtering information as a first process. If the transport object is not discarded after first-level filtering, then second-level filtering information, which requires the processing of the transport object, is used to fetch the messages in the bundle.

Messages may be delivered in an aggregated manner, so that multiple messages share the same transport object. In such a case, message filtering may be performed in two stages. In the first stage, the notification framework at the receiver, or user device, decides whether or not the transport object is of interest. In a second stage, if the transport object is found to be of interest, filtering of the notification messages is performed inside the transport object. Filtering information is then split over two levels, with the first-level filtering information being delivered outside of the transport object. The filtering criteria within the first-level filtering information that are common to all messages inside the transport object. The second level of filtering information is delivered inside the transport object itself. The second-level filtering information may provide complete filtering information for each message carried inside that transport object.

The notification framework defines extensions to the FDT to enable the signaling of filtering information for a specific transport object. The RTP payload format for notification messages also enables the signaling of filtering information that applies to the payload of an RTP packet.

Filtering criteria are defined for a given notification type and are identified by a unique identifier (ID). Each filtering criterion provides a list of possible filter values that are assigned to that filtering criterion. According to an exemplary embodiment, filter values may correspond to message topics whereas filtering criteria may represent classes of topics.

Figure 2:
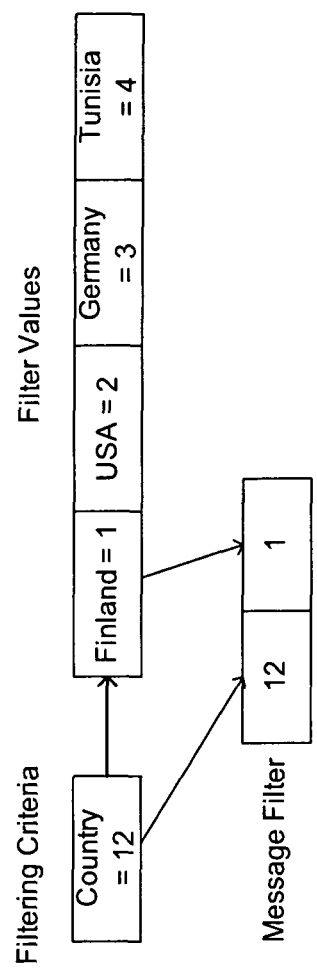
FIG. 2 illustrates an example filtering criterion and various filter values associated with the filtering criterion.

FIG. 2 illustrates an example filtering criterion and various filter values associated with the filtering criterion For example, in FIG. 2 a single filtering criterion, based upon Country and possessing an ID of 12, is shown. Filter values associated with the filtering criterion comprise 1 for Finland, 2 for the United States, etc. In the case where Finland is the desired country, the message filter includes the numbers 12, indicating the filtering criterion, and the filter value 1, indicating the proper country within the criterion.

The above hierarchical filtering is of general applicability and is applicable beyond the filtering of notification messages in the DVB-CBMS notification framework. In general, filtering criteria can be applied hierarchically to a set of messages so that filtering operations can be staggered and applied in multiple levels for improved filtering. However, because the messages of an aggregate do not typically share the same filtering criteria, the split of the filtering criteria over the different levels is not straightforward.

Various embodiments provide an apparatus and method for constructing multiple-level filtering information that applies to an aggregate of messages. According to various embodiments, the set of filtering values is built for the first level as the union of all filter values associated with the filtering criteria that are common to all messages inside of the transport object. In other words, within the first-level filtering information, the filter criteria that are common to all messages of the same aggregate are indicated. At the receiver side, the aggregate transport object is filtered based upon the defined criteria.

Several different systems and arrangements are possible for implementing various embodiments of the present invention. The following is a description of one particular implementation that is usable with the FLUTE transport of notification messages as specified by the DVB notification framework. A FLUTE object may carry several notification messages of the same notification type in an aggregate notification container.

Each message in the aggregate has a set of filtering criteria and values that indicate the classification of the message. Some filtering criteria are shared between messages of the aggregate. In order to enable efficient filtering, the filtering is performed on the sending side at two levels. In the first filtering level, the filtering criteria that are common to all messages of the aggregate are indicated. The union of all filter values of the common filtering criteria is constructed and located at the first level. The first-level filtering information is included as an extension to the FDT in various embodiments. At a second level, the complete filtering information of each of the messages in the aggregate is provided inside the transport object, either as part of the index list or within the generic message part of that notification message.

Figure 3:
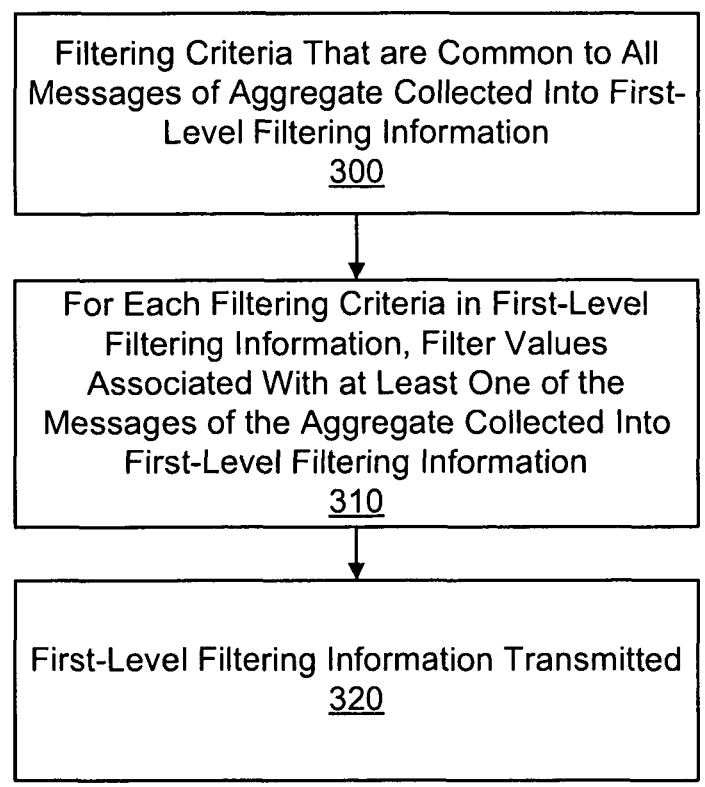
FIG. 3 is a flowchart showing the implementation of an exemplary first filtering level process at a sending device.

FIG. 3 shows an example process for implementing the first filtering level process described above. In this implementation, filtering criteria that are common to all messages of an aggregate are collected into first-level filtering information at 300. At 310, for each of the filtering criteria that have been collected into the first-level filtering information, filter values associated with at least one of the messages in the aggregate are collected into the first level filtering information at 310. At 320, all of the first-level filtering information is transmitted to a remote device. The first-level filtering information is transmitted separately from the transport object, for example within an index list or within a generic message part of a notification message.

Figure 4:
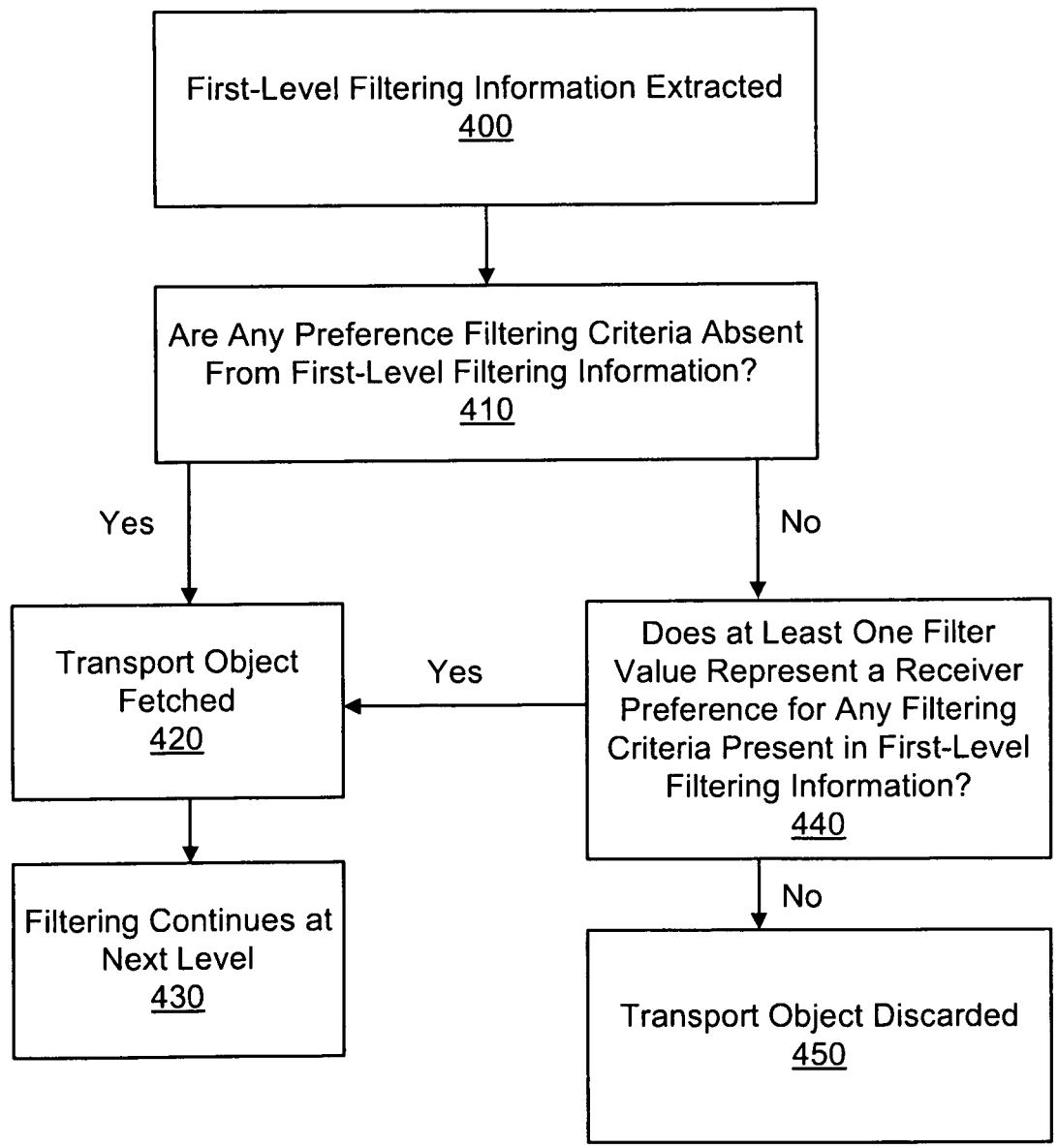
FIG. 4 is a flowchart illustrating a process for filtering aggregate messages at a receiving device, according to an exemplary embodiment of the present invention.

At the receiver side, the filtering may be performed according to the process depicted in FIG. 4 when there is an OR relationship between the two search criteria identified by the receiving device. At 400, received first-level filtering information for a transport object is extracted. At 410, it is determined whether there are any preference filtering criteria, i.e., search criteria identified by the receiving device, which are absent from the first-level filtering information. If it is determined that there are any preference filtering criteria absent in the first-level filtering information, then the receiving device cannot conclusively determine whether the OR conditions are met simply by examining the first-level filtering information. Therefore, in this situation the transport object is fetched at 420, and filtering continues at the next level at 430. If, on the other hand, all of the preference filtering criteria are present in the first-level filtering information, then at 440 is determined whether at least one filter value represents a receiver preference for any filtering criteria present in the first-level filtering information. If at least one such filter value does represent a receiver preference for a filtering criterion, then the system implements 420 and 430, fetching the transport object and continuing the filtering process at the next level. If, on the other hand, no filter value represents a receiver preference for any of the filtering criteria, then the transport object may be discarded at 450.

Figure 5:
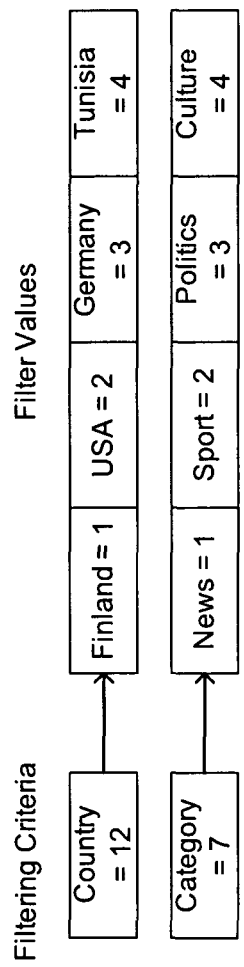
FIG. 5 is an example pair of filtering criteria and their corresponding filter values.
Figure 6:
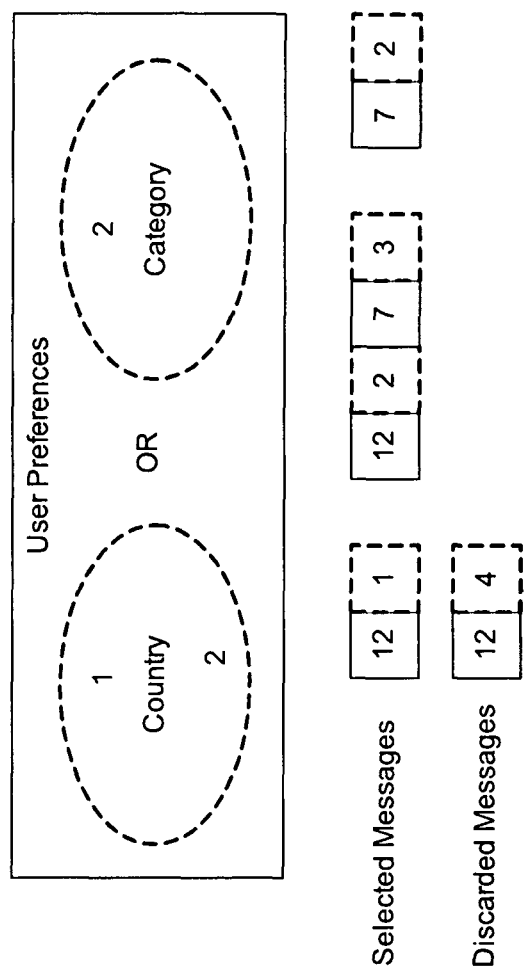
FIG. 6 is a diagram showing an example of user preferences expressed using an "OR" relationship and exemplary messages filtered using the user preferences.

This filtering method enables filtering with the assumption that the relationship between the different filtering criteria is an "OR" relationship. FIG. 5 is an example representation showing a pair of exemplary filtering criteria and various filter values associated therewith. FIG. 6 is an example depiction showing user preference selection and message filtering in an "OR" relationship using the filtering criteria and filter values from in FIG. 5. According to the user preferences of FIG. 6, any message that includes a filter value of "1" or "2" for the Country filtering criterion (12) or a filter value of "2" for the Category filtering criterion (7) is to be selected. If no such value/criterion combinations are included in the message, the message is discarded. For the sample set of messages depicted in FIG. 4, only the message including a filter value of "4" with a filtering criterion of "7" is discarded, as the other messages include at least one of the filter/criterion combinations.

The previously described message filtering method at the receiver can also be modified to support "AND" relationships between the different filtering criteria. This is accomplished by iterating through all of the filtering criteria at the first level and discarding the transport object as soon as at least one of the filter criteria indicates no value that corresponds to a user preference.

Figure 7:
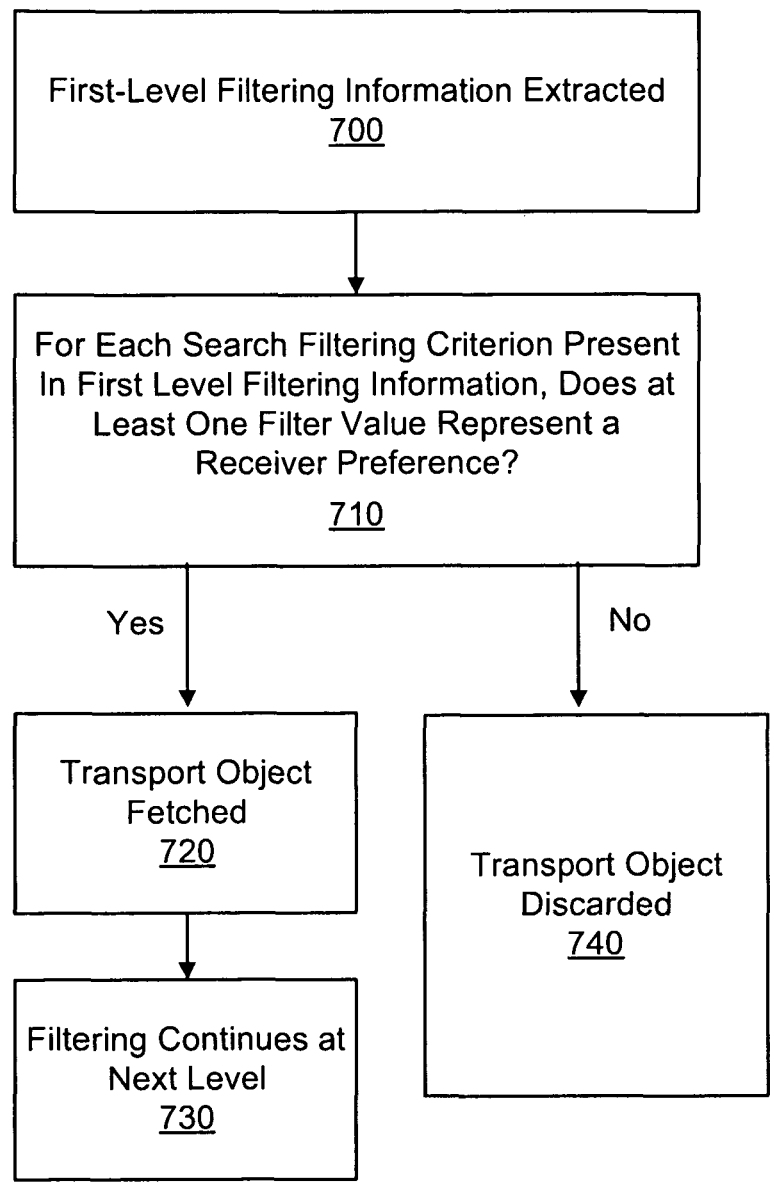
FIG. 7 is a flowchart illustrating a process for filtering aggregate messages, at a receiving device, according to an exemplary embodiment of the present invention where user preferences are expressed using an "AND" relationship.

FIG. 7 is an example process for filtering a transport object at a receiving device when filtering criteria are grouped in an "AND" relationship. At 700, first-level filtering information for a transport object is extracted. At 710, it is determined, for each search filtering criterion present in the first-level filtering information, whether at least one filter value represents a receiver preference. If so, then the transport object is fetched at 720 and filtering continues at the next level at 730. The transport object may also be fetched if there are no search filtering criteria present in the first level filtering information. If, on the other hand, for any search filtering criterion present in the first-level filtering information, there is no filter value representing a receiver preference, then the transport object is discarded at 740.

Figure 8:
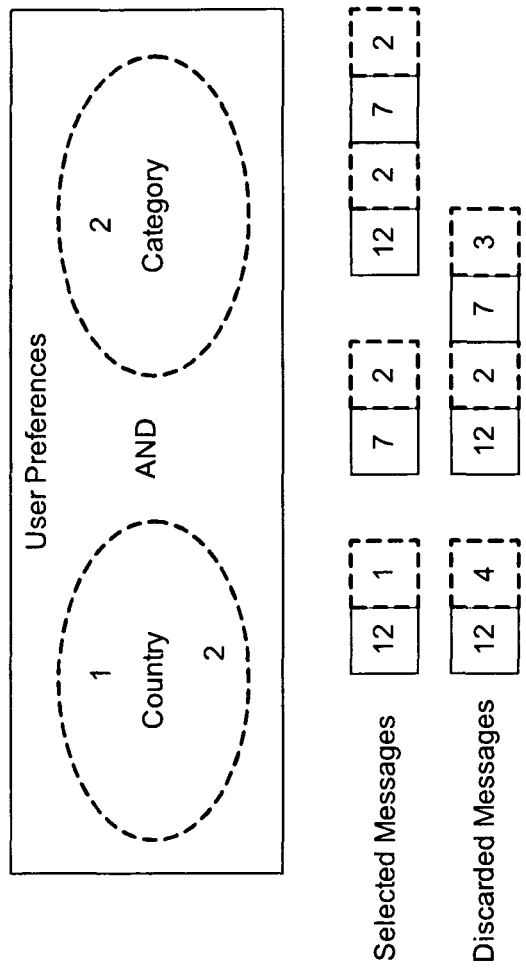
FIG. 8 is a diagram showing an example of user preferences expressed using an "AND" relationship and exemplary messages filtered using the user preferences.

FIG. 8 is an example depiction showing user preference selection and message filtering in an "AND" relationship using the filtering criteria definition depicted in FIG. 5. In this arrangement, a particular message includes a filter value other than "1" or "2" for the Country filtering criterion (12) or a filter value other than "2" in the Category criterion (7), the message is discarded. For the sample set of messages depicted in FIG. 8, the message including a filter value of "4" with a filtering criterion of "12" is discarded, as well as a message including a filter value of "3" with a filtering criterion of "7." With regard to the latter message, this message is discarded even though the filter criterion "12" includes a filter value of "2" due to the required AND relationship.

The filtering criteria for a transport object that aggregates multiple messages is carried separately from the transport object itself. As mentioned previously, the transport protocol is FLUTE in particular embodiment. The filtering information for the aggregate is carried in the FDT, which is processed by the receiver prior to the reception of transport objects. This enables additional efficiency, since transport objects that carry messages deemed not of interest to the receiver are discarded after processing the FDT. The following example shows an exemplary FDT instance that includes filtering criteria for an aggregate of messages.

```
<?xml version="1.0" encoding="UTF-8"?>
<FDT-Instance
    FEC-OTI-FEC-Encoding-ID="1"
    FEC-OTI-Encoding-Symbol-Length="512"
    Expires="331129600">
```

-continued

```
<File
        Content-Type="application/vnd.dvb.notif-container+xml"
        Content-Length="7543"
        Transfer-Length="4294"
        TOI="27"
        Content-Location="notification:container:983">
        <NotificationAggregateDescription>
            <FilterElementList>0C010C0207020703</FilterElementList>
        </NotificationAggregateDescription>
    </File>
</FDT-Instance>
```

The above FDT instance example contains an XML element entitled "FilterElementList." This XML element applies to the transport object described by the "File" element. The filter element list is a set of filter criteria IDs and filter values given in hexadecimal form or encoded in another representation such as, for example, Base64 encoding. In this example, OC corresponds to 12, which is the ID of the Country filter criterion and 07 corresponds to the ID of the Category filter criterion. The filter values 01 and 02 of the Country filter criterion correspond to Finland and the United States of America, respectively. The filter values 2 and 3 of the Category filtering criterion correspond to Sport and Politics, respectively.

To avoid repetition of the filter criterion ID, a different representation may be selected in which a filter criterion ID is followed by the IDs of all filter values that apply to at least one of the messages in the aggregate. One potential representation involves reserving one bit of the ID field to differentiate between the ID of filter criterion (e.g., identified by 0) and the ID of a filter value (e.g., identified by 1). The above list would then appear as follows: 0C8182078283, with the digits represented by zeros in this instance being IDs of filter criteria.

As discussed previously, various embodiments of the present invention serve to enable the fast filtering and discarding of messages that are not of interest to the receiver. In these embodiments, the receiver can avoid retrieving a transport object that carries an aggregate of messages, if the filtering information at the first level indicates that the messages are not of interest to the receiver. In addition, various embodiments also serve to eliminate "false negatives," where a transport object is discarded even though it contains a message that is of interest to the user. Such false negatives are eliminated because the filtering information at the first-level only contains filtering criteria that are common to all messages. For those filtering criteria, all filter values that are used by the messages in the aggregate are listed. Discarding only occurs when none of those criteria are met.

Also as mentioned previously, various embodiments serve to reduce the number of false positives, which occur when the transport object is declared to be of interest even though its messages are not of interest to the receiver. This can occur, for example, in the case of an "AND" relationship between a filtering criteria that is common to all messages, i.e., that is indicated at the first level, and another filtering criteria which is not common, i.e., that only appears inside the transport object. In general, filtering criteria that are not common to all messages of the aggregate and, consequently, are not visible in the first level, may lead to a false positive as the receiver cannot make a discarding decision at the first level.

In the case of an OR relationship, if the user indicates a preference with regard to filter criterion that is not common to all messages, i.e. that does not appear at the aggregate level, the receiver according to various embodiments cannot discard the transport object immediately. Instead, the receiver has to process the filtering information that is present inside the transport object, i.e. at the message level.

Figure 9:
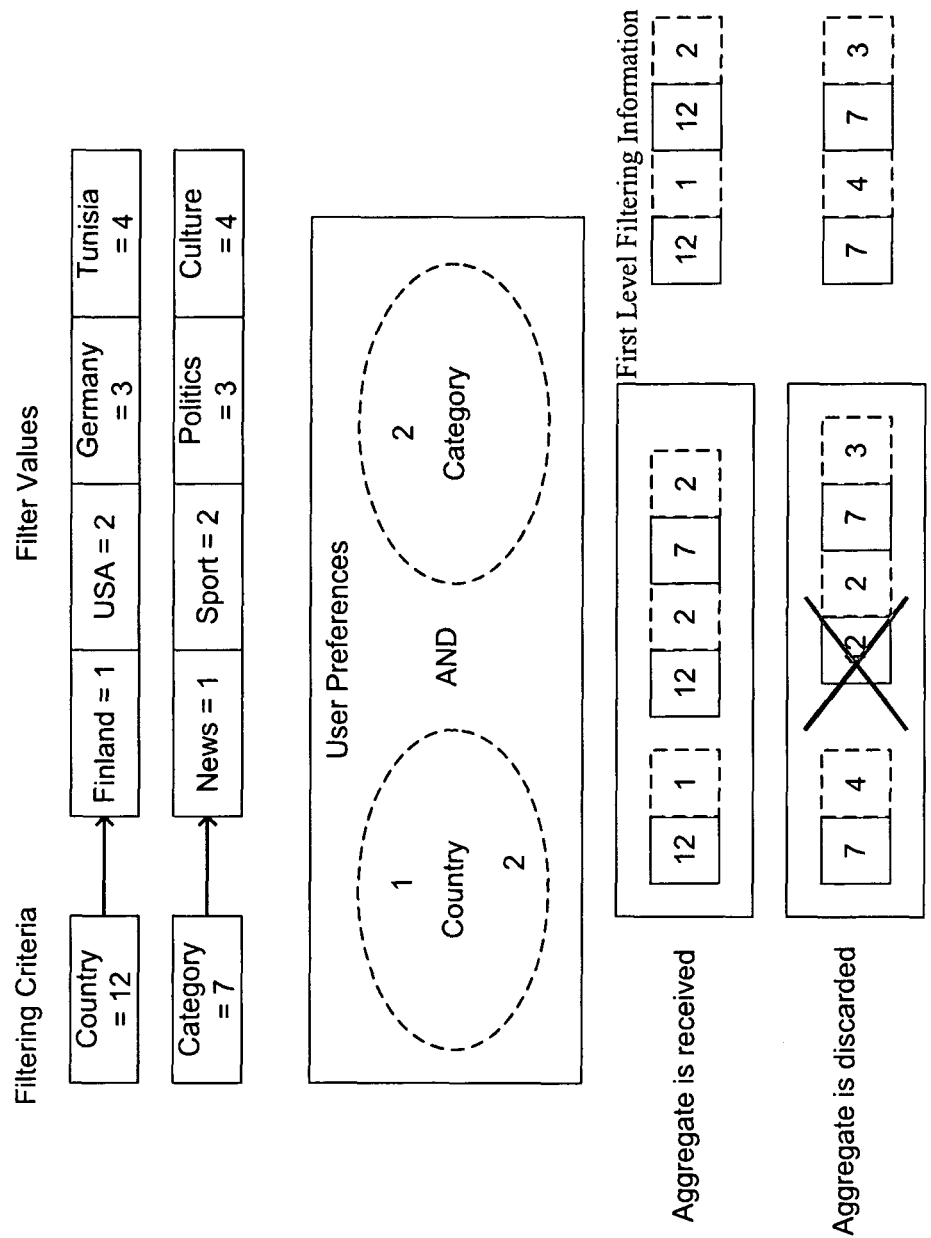
FIG. 9 illustrates an example of a transport object received by user device and an example of a transport object discarded by the user device based on user preferences expressed in terms of an "AND" relationship.

In the case of an AND relationship between common filtering criteria, the user indicates a preference for receiving messages that contain a combination of 2 or more criteria. FIG. 9 is an example depiction showing user preference selection and message filtering, at only the aggregate level, in an "AND" relationship. As depicted in FIG. 9, the first-level filtering information associated with each transport object is used to determine whether the respective transport object is to be discarded. In the case of FIG. 9, the second transport object is discarded since the first level filtering information (7:4 and 7:3) is not in accordance with the user preferences, which only lists the filter value of "2" with the criterion "7". Since the criterion "12" does not appear in every message in the lower transport object, it does not appear in the corresponding first-level filtering information. On the other hand, the first transport object is fetched for subsequent filtering since its associated first-level filtering information, 12:1 and 12:2, corresponds to the user preferences. In the case of the first transport object, the criterion "7" does not appear in the first level filtering information since it does not appear in every message of the respective transport object.

Figure 10:
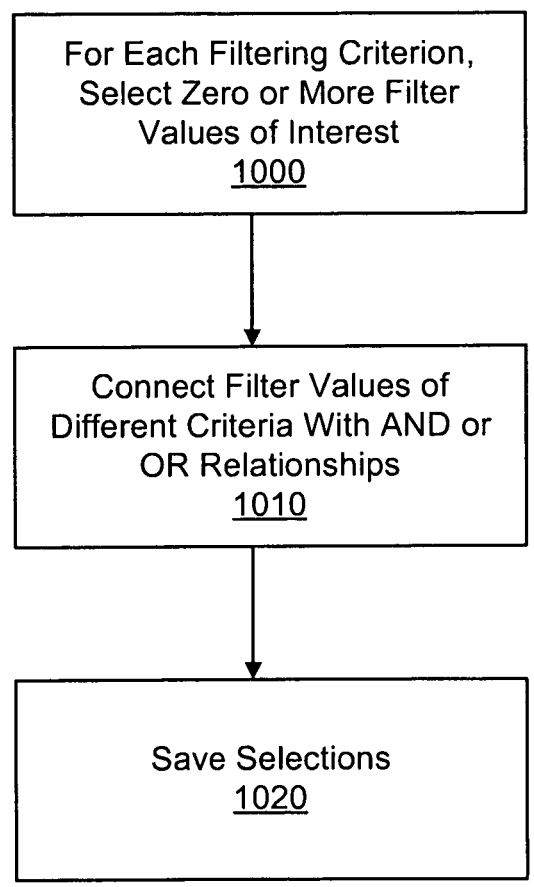
FIG. 10 is a flow chart showing how user preferences may be constructed according to an exemplary embodiment of the present invention.

FIG. 10 is a flow chart showing how user preferences may be constructed according to various embodiments. At 1000 in FIG. 10, for each filtering criterion, the user selects zero or more filter values of interest. At 1010, each selected filter value for one criterion is connected to each filter value for other criteria using the prior relationship. In a particular embodiment, OR is the default relationship. At 1020, the user selections at 1000 and 1010 are saved. The selections can be saved in algebraic form, which will vary depending upon user's selections. For example, the set of user selections can be represented as $$(A_1 \text{ AND} \ldots A_m) \text{ OR } (B_1 \text{ AND} \ldots B_n)$$

where each of the symbols is a label of a filter criteria and is of the form $A_{d=\gamma 1} \text{ OR} \ldots \gamma_j$, where each $\gamma$ is a particular filter value for a filter criteria A.

Figure 11:
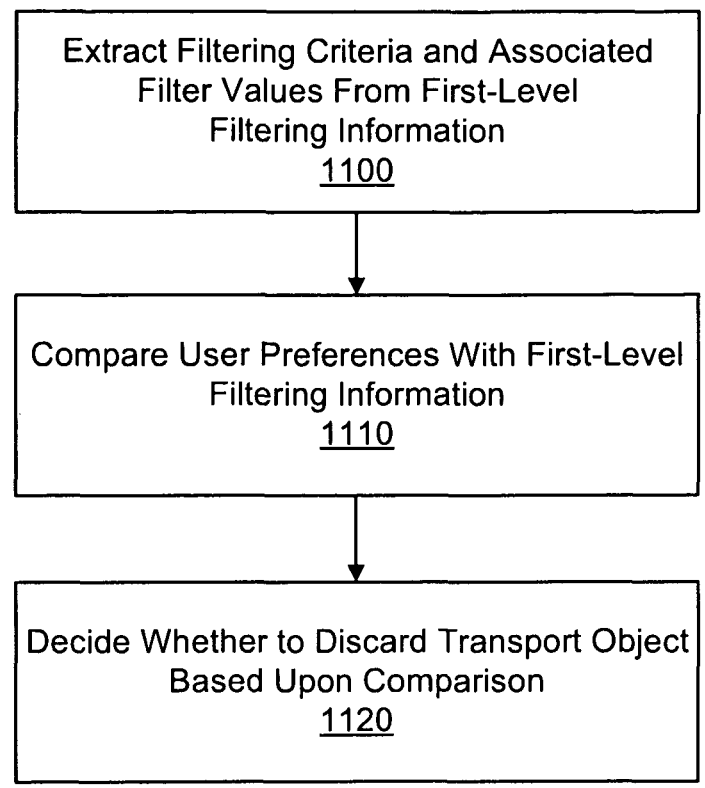
FIG. 11 is a flow chart showing an exemplary filtering process based on user preferences expressed in terms of logical operators.

FIG. 11 shows a generic first-level filtering process at a receiving device for received first-level filtering information associated with a transport object. This generic process is usable for user preferences covering virtually any logic relationship including AND, OR and/or NOT identifiers. At 1100 in FIG. 11, filtering criteria and associated filter values are extracted from received first-level filtering information. At 1110, user preferences are compared with the first-level filtering information, wherein the user preferences are expressed in terms of at one logical operator. At 1120 and based at least in part on the comparison, it is decided whether to discard a transport object associated with the received first level filtering information. If the transport object is not discarded, then an additional filtering process is performed on the transport object.

Figure 12:
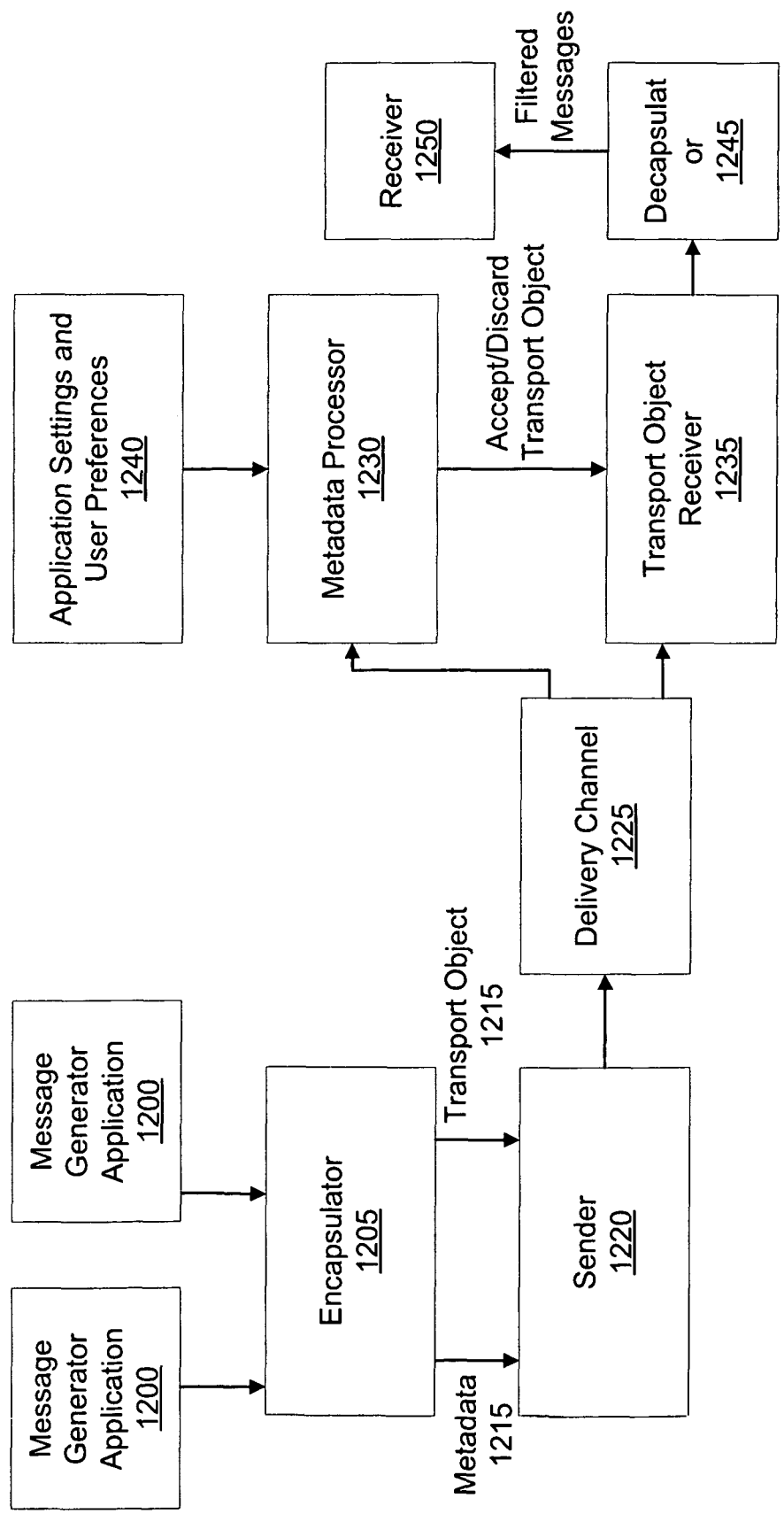
FIG. 12 is a flow chart showing the general process by which transport objects and first-level filtering information are created and transported according to an exemplary embodiment of the present invention.

FIG. 12 shows the general process by which transport objects are created and transported according to various embodiments. One or more message generator applications 1200 are used to generate messages as necessary. These messages are then encapsulated into a transport object 1210 by an encapsulator 1205, which then sends both the transport object 1210 and associated metadata 1215 to a sender 1220. The sender 1220 transmits the transport object 1210, e.g., using the FLUTE protocol, and the metadata 1215 over a delivery channel 1225. The metadata 1215 is ultimately sent to a metadata processor 1230, while the transport objects 1210 are sent to a transport object receiver 1235. The metadata processor 1230 uses application settings and user preferences 1240 to determine whether the transport object 1210 should be accepted or discarded. This result of this determination is provided to the transport object receiver 1235. If the transport object 1210 is to be received, then the transport 1210 is provided to a decapsulator 1245, with the filtered messages ultimately being provided to a receiver 1250.

Figure 13:
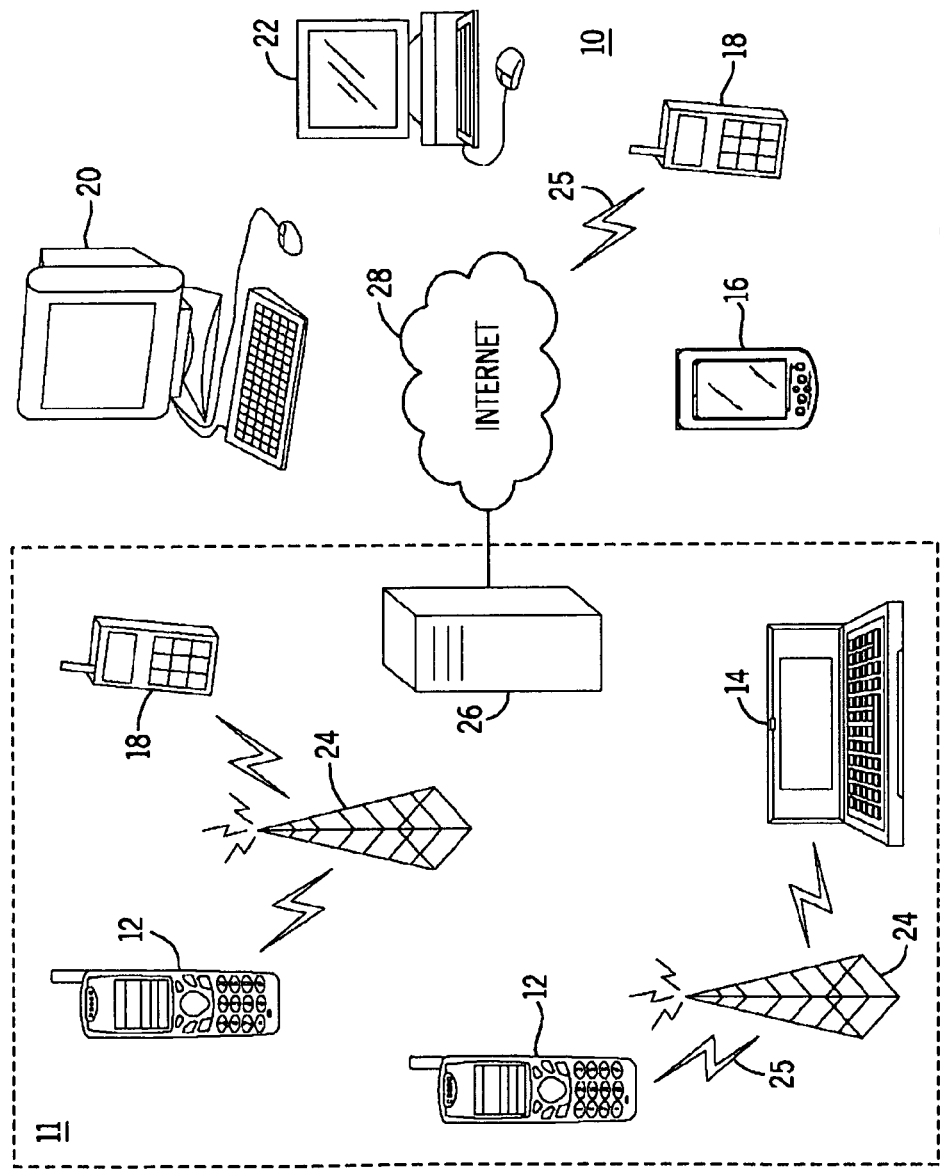
FIG. 13 is an overview diagram of a system within which various embodiments of the present invention may be implemented.

FIG. 13 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 13 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 14:
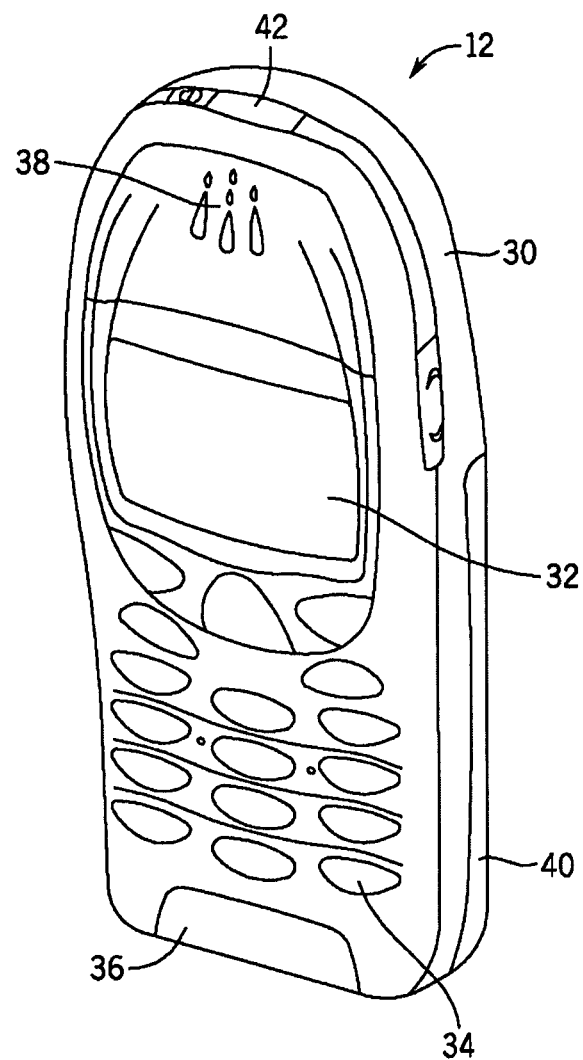
FIG. 14 is a perspective view of an electronic device that can be used in conjunction with the implementation of various embodiments of the present invention.
Figure 15:
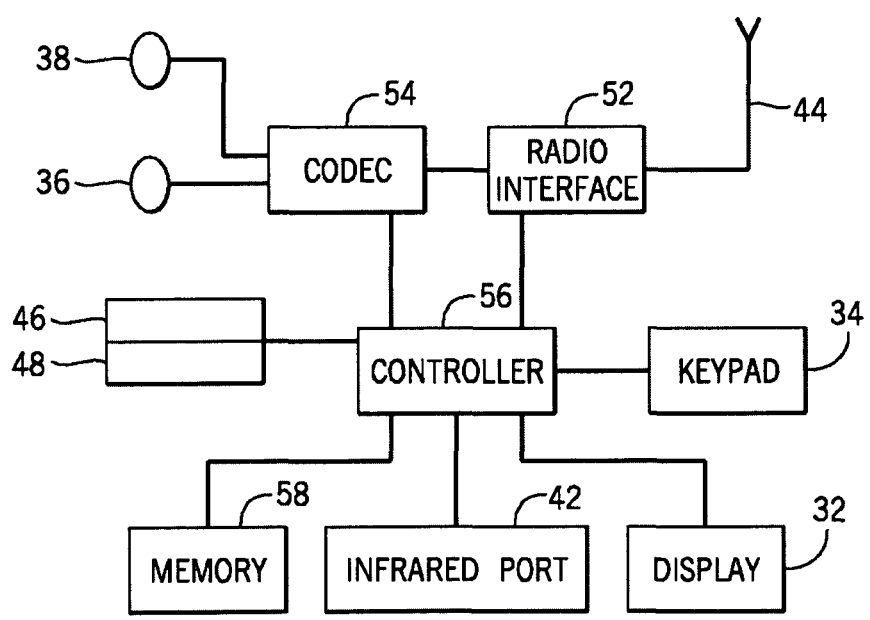
FIG. 15 is a schematic representation of the circuitry which may be included in the electronic device of FIG. 14.

FIGS. 14 and 15 show one representative electronic device 12 within which the present invention may be implemented. It should be understood, however, that the present invention is not intended to be limited to one particular type of device. The electronic device 12 of FIGS. 14 and 15 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

The various embodiments described herein are described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   for a transport object that is to be transmitted to a remote device, collecting, by a computing device, into first-level filtering information, filtering criteria that are common to all messages of a message aggregation within the transport object;
   for each filtering criterion in the first-level filtering information, collecting, into the first-level filtering information, a set of filter values associated with all messages of the message aggregation, wherein the set of filter values is determined as a union of filter values associated with the filtering criteria; and
   providing the remote device with an indication of what is common to the message aggregation at least in part by transmitting the first-level filtering information to the remote device.

2. The method of claim 1, wherein the first-level filtering information is transmitted separate from the transport object.

3. The method of claim 2, wherein the first-level filtering information is included in a file delivery table.

4. A non-transitory computer-readable storage medium comprising computer code that, when executed, causes an apparatus at least to:
   for a transport object that is to be transmitted to a remote device, collect, into first-level filtering information, filtering criteria that are common to all messages of a message aggregation within the transport object;
   for each filtering criterion in the first-level filtering information, collect, into the first-level filtering information, a set of filter values associated with all messages of the message aggregation, wherein the set of filter values is determined as a union of filter values associated with the filtering criteria; and
   provide the remote device with an indication of what is common to the message aggregation at least in part by transmitting the first-level filtering information to the remote device.

5. The non-transitory computer-readable storage medium of claim 4, wherein the first-level filtering information is transmitted separate from the transport object.

6. The non-transitory computer-readable storage medium of claim 5, wherein the first-level filtering information is included in a file delivery table.

7. The method of claim 1, further comprising:
   transmitting the transport object to the remote device, wherein the transport object includes second-level filtering information that provides filtering information for each message in the transport object.

8. An apparatus, comprising:
   at least one processor; and
   at least one memory including computer program code, the at least one memory and the computer program code configured to, with the at least one processor, cause the apparatus at least to:
   for a transport object that is to be transmitted to a remote device, collect, into first-level filtering information, filtering criteria that are common to all messages of a message aggregation within the transport object;
   for each filtering criterion in the first-level filtering information, collect, into the first-level filtering information, a set of filter values associated with all messages of the message aggregation, wherein the set of filter values is determined as a union of filter values associated with the filtering criteria; and
   provide the remote device with an indication of what is common to the message aggregation at least in part by transmitting the first-level filtering information to the remote device.

9. The apparatus of claim 8, wherein the first-level filtering information is transmitted separate from the transport object.

10. The apparatus of claim 9, wherein the first-level filtering information is included in a file delivery table.

11. A method, comprising:
    receiving, by a computing device, first-level filtering information that provides an indication of what is common to a message aggregation of a transport object, wherein said first-level filtering information enables the computing device to determine whether the transport object is of interest to the computing device based on filtering criteria or a set of filter values, and wherein the first-level filtering information includes the filtering criteria and the set of filter values;
    determining, whether the transport object is of interest to the computing device based on the filtering criteria or the set of filter values; and
    responsive to determining that the transport object is not of interest, discarding the transport object, and
    wherein the filtering criteria is common to all messages of the message aggregation, wherein the set of filter values is associated with all messages of the message aggregation, and wherein the set of filter values defines a union of filter values associated with the filtering criteria.

12. The method of claim 11, wherein the first-level filtering information is received separate from the transport object.

13. The method of claim 12, wherein the first-level filtering information is included in a file delivery table.

14. A non-transitory computer-readable storage medium comprising computer code that, when executed, causes an apparatus at least to:
    receive first-level filtering information that provides an indication of what is common to a message aggregation of a transport object, wherein said first-level filtering information enables the apparatus to determine whether the transport object is of interest to the apparatus based on filtering criteria or a set of filter values, and wherein the first-level filtering information includes the filtering criteria and the set of filter values;
    determine whether the transport object is of interest to the apparatus based on the filtering criteria or the set of filter values; and
    responsive to determining that the transport object is not of interest, discarding the transport object, and
    wherein the filtering criteria is common to all messages of the message aggregation, wherein the set of filter values is associated with all messages of the message aggregation, and wherein the set of filter values defines a union of filter values associated with the filtering criteria.

15. The non-transitory computer-readable storage medium of claim 14, wherein the first-level filtering information is transmitted separate from the transport object.

16. The non-transitory computer-readable storage medium of claim 15, wherein the first-level filtering information is included in a file delivery table.

17. The method of claim 11, further comprising:
if it is determined that a particular transport object is of interest, fetching the particular transport object and performing a second-level filtering process using second-level filtering information that is included in the particular transport object;
wherein the second-level filtering information provides filtering information for each message in the particular transport object.

18. An apparatus, comprising:
at least one processor; and
at least one memory including computer program code, the at least one memory and the computer program code configured to, with the at least one processor, cause the apparatus at least to:
receive first-level filtering information that provides an indication of what is common to a message aggregation of a transport object, wherein said first-level filtering information enables the apparatus to determine whether the transport object is of interest to the apparatus based on filtering criteria or a set of filter values, and wherein the first-level filtering information includes the filtering criteria and the set of filter values;
determine whether the transport object is of interest to the apparatus based on the filtering criteria or the set of filter values; and
responsive to determining that the transport object is not of interest discarding the transport object, and
wherein the filtering criteria is common to all messages of the message aggregation, wherein the set of filter values is associated with all messages of the message aggregation, and wherein the set of filter values defines a union of filter values associated with the filtering criteria.

19. The apparatus of claim 18, wherein the first-level filtering information is received separate from the transport object.

20. The apparatus of claim 18, wherein the first-level filtering information is included in a file delivery table.

* * * * *